United States Patent

[11] 3,577,183

[72] Inventor Hermann Walter Gruenling
        Erlangen-Bruck, Germany
[21] Appl. No. 708,882
[22] Filed Feb. 28, 1968
[45] Patented May 4, 1971
[73] Assignee Siemens Aktiengesellschaft
        Berlin and Munich, Germany
[32] Priority Mar. 25, 1967
[33]         Germany
[31]         S109022

[54] ELECTRICAL TEMPERATURE SENSOR
     4 Claims, 5 Drawing Figs.
[52] U.S. Cl. ..................................................... 338/26,
                                                    338/28, 73/362
[51] Int. Cl. ..................................................... H01c 7/08
[50] Field of Search .......................................... 338/25, 26,
                                                    28; 73/362 (R)

[56] References Cited
UNITED STATES PATENTS

| 822,338 | 6/1906 | Bennett | 73/362(R) |
| 2,569,714 | 10/1951 | Gregory | 338/26X |
| 2,842,648 | 7/1958 | Reynolds | 338/26 |
| 3,089,339 | 5/1963 | Rogers et al. | 73/362(R) |
| 3,334,322 | 8/1967 | Bales | 73/362(R) |

Primary Examiner—Rodney D. Bennett, Jr.
Assistant Examiner—T. H. Tubbesing
Attorneys—Curt M. Avery, Arthur E. Wilfond, Herbert L. Lerner and Daniel J. Tick ABSTRACT: Wire of a material having electrical resistance which varies in magnitude in accordance with temperature variations is covered with glass insulation and is directly mounted on a body whose temperature is to be sensed.

PATENTED MAY 4 1971　　3,577,183

ELECTRICAL TEMPERATURE SENSOR

DESCRIPTION OF THE INVENTION

My invention relates to an electrical temperature sensor. More particularly, my invention relates to an electrical temperature sensor for sensing the temperature of a body.

High-temperature devices or appliance such as, for example, hot plates, irons, heaters, electric ovens or stoves, and the like, may be controlled in temperature by a temperature-sensitive electrical conductor. The electrical resistance of the conductor varies with variations in temperature and thereby provides a control medium for the appliance or device. The temperature-sensitive electrical conductor is utilized in good heat contact, or good heat conducting relationship, with the body or member whose temperature is to be controlled and/or measured and may comprise, for example, a thermistor functioning as a temperature sensor, doped nickel, hyperpure nickel, or the like.

Usually the described type of temperature sensor comprises a carrier body of good heat conductivity such as for example, copper or aluminum, and a very thin electrically conductive wire of high resistance would on such carrier body. The wire is of high resistance and is electrically insulated from but in good heat contact with the carrier body. The wire may have a diameter of, for example, approximately 30 microns. The carrier body may have the configuration of a plate, a solid cylinder or a hollow cylinder, for example. The insulation between the high resistance wire and the carrier body may be provided by a heat-resistant inorganic binder under a thin mica foil. The resistance wire must be wound at a specific spacing between the turns and must be affixed to the carrier body by a suitable adhesive or cement in order to prevent slippage of turns and possible short-circuiting between turns.

The insulation may, of course, be provided otherwise, such as, for example, by electrophoretic mica formation, anadization, the application of enamel, or the like. None of these, however, is of sufficient simplicity and reliability to be utilized in mass production. In addition to the difficulties inherent in providing suitable insulation and in suitably mounting the winding on the carrier body, a problem of breakage of the wire of the winding, which is very thin, arises. Although the wire is of good strength, it has a low load capacity, due to its small diameter, and is therefore very difficult to handle without breakage.

The principle object of the present invention is to provide a new and improved electrical temperature sensor.

An object of the present invention is to provide an electrical temperature sensor which avoids the difficulties of the sensors of the prior art.

An object of the present invention is to provide an electrical temperature sensor which is produced by a considerably simpler process than the electrical temperature sensor of the prior art, so that the temperature sensor of the present invention need not be produced under laboratory conditions, but may be mass produced.

An object of the present invention is to provide an electrical temperature sensor which is considerably easier to handle and to process than the temperature sensor of the prior art and is not as susceptible to breakage as the temperature sensors of the prior art.

An object of the present invention is to provide an electrical temperature sensor having smaller dimensions than the temperature sensors of the prior art.

An object of the present invention is to provide an electrical temperature sensor which is directly mounted on or affixed to the body or member to be measured or controlled and which may be compactly joined with other similar electrical sensors thereby eliminating the necessity for subsequent joining processes.

Another object of the present invention is to provide an electrical temperature sensor which functions to provide more exact control than the electrical temperature sensors of the prior art with efficiency, effectiveness and reliability.

In accordance with my invention, an electrical temperature sensor for sensing the temperature of a body comprises wire of a material having an electrical resistance which varies in magnitude in accordance with temperature variations. Glass insulation covers the wire. The insulated wire is directly mounted on the body.

The insulated wire may be would in turns adjacent each other along an axis or in substantially planar spiral configuration. A film of blacking on a base of polyvinylacetate may be provided on the wire. A metallized outer surface may be provided on the insulation and the insulated wire may then be directly mounted and affixed to the body in good heat contacting relationship by solder.

The insulated wire with metallized outer surface on the insulation may be embedded in the body and the body may comprise part of a heat producing appliance.

In order that the present invention may be readily carried into effect, it will now be described with reference to the accompanying drawing, wherein.

In the FIGS., the same components are identified by the same reference numerals.

Figure 1:
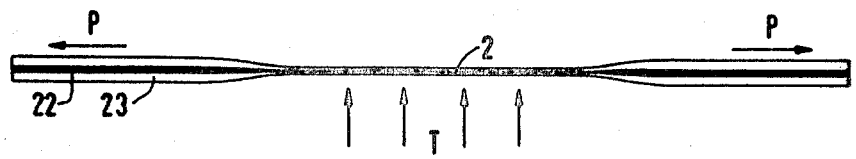
FIG. 1 is a schematic diagram illustrating the method of providing glass insulation on a wire.

As shown in FIG. 1, glass insulation may be provided on an electrically conductive wire 22 by inserting said wire in a glass tube 23. The glass tube 23 is then heated by any suitable means, as indicated by a plurality of arrows T, until the glass softens. The glass tube 23 is then stretched, pulled or elongated in the directions of arrows P until it is of the desired diameter.

Since the temperature-sensitive wire 22 is provided with glass insulation 23 to form a glass insulated wire 2, prior to the mounting of such wire on a body to be measured and/or controlled, there is no need for an intermediate layer of insulation between said wire and said body. The glass insulated wire 2 may have a diameter of approximately 30 microns, with the ratio of the diameter of the glass insulation to the diameter of the wire being 3:1 or more. The smallest bending radius of the glass insulation or glass insulated fiber is approximately 25 times the diameter of said glass insulation. The strength of the glass insulated wire is very great and may be as high as approximately 500 kiloponds per square millimeter, depending upon the composition of the wire, the composition of the glass insulation and the thickness or diameter of said insulation.

Figure 2:
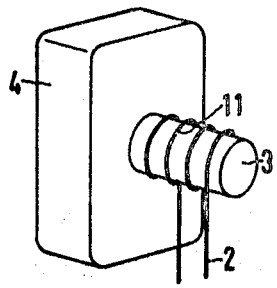
FIG. 2 is a schematic diagram, in perspective, illustrating a form of winding of the electrical temperature sensor of the present invention on a body to be measured and/or controlled.

As shown in FIG. 2, the electrical temperature sensor of the present invention, comprising a glass insulated temperature-sensitive wire 2, may be wound in turns adjacent each other along an axis so it is in the configuration of a cylindrical winding 11. The glass insulated wire 2 is thus wound on a heat contacting body 3 which is in heat conductive relationship with a body 4 whose temperature is to be measured and/or controlled.

Figure 3:
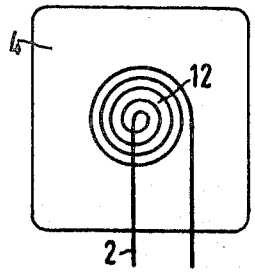
FIG. 3 is a schematic diagram illustrating another form of winding of the electrical temperature sensor of the present invention on a body to be measured and/or controlled.

As shown in FIG. 3 the electrical temperature sensor of the present invention, comprising a glass insulated temperature-sensitive wire 2, may be wound in substantially planar spiral configuration 12. The glass insulated wire 2 is thus directly mounted on or affixed to the body 4 whose temperature is to be measured and/or controlled.

Figure 4:
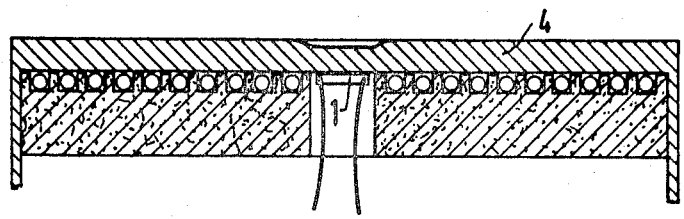
FIG. 4 is a sectional view of a heat producing appliance with an electrical temperature sensor of the present invention mounted on part thereof.

In FIG. 4, the electrical temperature sensor of the present invention, identified by the reference numeral 1, is mounted on and affixed to the heat producing part of a hot plate 4 which is the body whose temperature is to be measured and/or controlled.

A film of blacking comprising blacking or cinder paste on a base of polyvinylacetate may be applied to the wire (FIG. 1). The film of blacking 22a (FIG. 5) considerably increases the resistance of the wire to surface damage and thereby greatly facilitates handling and processing of said wire. The film of blacking comprising polyvinylacetate is applied to the wire immediately after it is produced. The film of blacking is applied in any suitable manner such as, for example, by immersion of the wire in a liquefied version of the blacking.

Due to the covering of the wire 22 with glass insulation 23, the glass insulated wire 2 has a larger diameter than the wire of an electrical temperature sensor of the prior art. The temperature sensor of the present invention may be readily mass produced without the need for maintaining laboratory conditions, since the production thereof is considerably more simple than the production of the temperature sensor of the prior art. This results from the fact that an intermediate layer of insulation or good heat conductivity is not necessary and does not have to be provided in the temperature sensor of the present invention. Since the outer diameter of the glass insulated wire of the temperature sensor of my invention may be as small as approximately 30 microns, the number of turns of the winding may be reduced (FIGS. 2 and 3), while maintaining the same rate of variation of electrical resistance of the wire, so that said temperature sensor may have considerably smaller dimensions than prior art temperature sensors and thus provides more exact control.

Figure 5:
FIG. 5 is a sectional view of an electrical temperature sensor of the present invention directly affixed by solder to a body to be measured and/or controlled.

The outer surface of the glass insulation 23 may be metallized. Thus, as shown in FIG. 5, a metallized outer surface 24 is provided on the glass insulation 23. The wire 22 is embedded in the glass insulation 23. The metallized surface may be provided in any suitable manner such as, for example, immersion in a metal melt, vapor deposition, vapor plating, or the like. The insulated wire with a metallized outer surface 24 on the insulation may be directly mounted on and affixed to the body 4 to be measured and/or controlled in good heat conducting relationship by solder 25. The metallized outer surface 24 also permits the glass insulated wire to be embedded in the body to be measured and or controlled. The embedding of the temperature sensor directly in the body to be controlled may be accomplished by any suitable means such as for example, solder, a powder metallurgical process, or the like. This enables the temperature sensor of the present invention to be adjusted to the structural features of the heat producing device or appliance in which it is utilized.

The glass insulated wire of the present invention may be utilized on a carrier body, in which case it may be affixed thereto by solder. When solder is utilized to affix the temperature sensor of my invention to the body to be measured and/or controlled, or to a carrier body, such solder considerably improves the heat transfer characteristics between said body and said temperature sensor and also provides considerable stability since it prevents slippage of said sensor of said body. If desired, the temperature sensor of the present invention may be soldered into a suitable housing or body of, for example, metal, to protect said sensor from damage caused by mechanical forces.

The wire 22 (FIGS. 1 and 5) may comprise semiconductor material instead of electrically conductive material. Furthermore, a thermistor may be utilized as the temperature sensor at suitably low melting temperatures.

While the invention has been described by means of specific examples and in specific embodiment I do not wish to be limited thereto, for obvious modifications will occur to those skilled in the art without departing from the spirit and scope of the invention.

I claim:

1. An electrical temperature sensor for sensing the temperature of a body, said sensor comprising closely wound wire of a material having an electrical resistance which varies in magnitude in accordance with temperature variations, a film of blacking comprising polyvinylacetate on said wire and glass insulation covering said wire, the insulated wire being directly mounted on said body.

2. An electrical temperature sensor for sensing the temperature of a body, said sensor comprising wire of a material having an electrical resistance which varies in magnitude in accordance with temperature variations, glass insulation covering said wire, and a metallized outer surface on said insulation, the insulated wire being directly mounted on and affixed to said body in good heat conducting relationship by solder.

3. An electrical temperature sensor as claimed in claim 2, wherein said insulated wire with a metallized outer surface on said insulation is embedded in said body.

4. An electrical temperature sensor as claimed in claim 2, further comprising a film of blacking comprising polyvinylacetate on said insulated wire.